United States Patent
Watanabe et al.

(10) Patent No.: US 8,585,550 B2
(45) Date of Patent: *Nov. 19, 2013

(54) COAST STOP VEHICLE AND CONTROL METHOD FOR COAST STOP VEHICLE

(75) Inventors: Shinichiro Watanabe, Yokohama (JP); Keichi Tatewaki, Atsugi (JP); Naohiro Yamada, Atsugi (JP); Noritaka Aoyama, Atsugi (JP)

(73) Assignee: Jatco Ltd, Fuji-shi (JP)

( * ) Notice: Subject to any disclaimer, the term of this patent is extended or adjusted under 35 U.S.C. 154(b) by 78 days.

This patent is subject to a terminal disclaimer.

(21) Appl. No.: 13/301,191

(22) Filed: Nov. 21, 2011

(65) Prior Publication Data

US 2012/0135841 A1  May 31, 2012

(30) Foreign Application Priority Data

Nov. 25, 2010 (JP) .................................. 2010-262435

(51) Int. Cl.
*F16H 61/00* (2006.01)
*B60W 10/00* (2006.01)
*B60W 10/02* (2006.01)
*B60W 10/04* (2006.01)

(52) U.S. Cl.
USPC .............. 477/118; 477/77; 477/174; 477/180

(58) Field of Classification Search
USPC ....................... 477/77, 118, 174, 175, 180
See application file for complete search history.

(56) References Cited

U.S. PATENT DOCUMENTS

| | | | |
|---|---|---|---|
| 6,719,664 B2 * | 4/2004 | Ito et al. | 477/176 |
| 6,773,372 B2 * | 8/2004 | Matsubara et al. | 477/78 |
| 6,860,833 B2 * | 3/2005 | Ayabe | 477/121 |
| 6,908,413 B2 * | 6/2005 | Ayabe et al. | 477/109 |
| 7,294,092 B2 * | 11/2007 | Walker et al. | 477/107 |

FOREIGN PATENT DOCUMENTS

JP 2010-164143 A 7/2010

* cited by examiner

*Primary Examiner* — Tisha Lewis
(74) *Attorney, Agent, or Firm* — Foley & Lardner LLP

(57) ABSTRACT

A coast stop vehicle includes a hydraulic pressure supplying unit which supplies a hydraulic pressure to the transmission while the engine is stopped, a coast stop start condition judging unit which judges whether or not a coast stop start condition holds, a coast stop control unit which stops the engine when the coast stop start condition is judged to hold by the coast stop start condition judging unit and starts the engine when receiving an acceleration request from a driver during the coast stop, a transmission control unit which causes a downshift of the transmission when receiving the acceleration request from the driver during the coast stop, and a hydraulic control unit which supplies the hydraulic pressure to an after-shift frictional engagement element which realizes a gear position after the downshift of the transmission during the coast stop.

13 Claims, 6 Drawing Sheets

COAST STOP VEHICLE AND CONTROL METHOD FOR COAST STOP VEHICLE

FIELD OF THE INVENTION

The present invention relates to a coast stop technology for automatically stopping an engine during travel of a vehicle.

BACKGROUND OF THE INVENTION

JP2010-164143A discloses a coast stop technology for automatically stopping an engine during travel of a vehicle for the purpose of reducing fuel consumption amount.

SUMMARY OF THE INVENTION

When an acceleration request is given from a driver during a coast stop, an engine may be started at that point of time and a transmission may be shifted down to respond to the acceleration request from the driver. However, if a downshift takes time, there will be a delay in obtaining drive power required by the driver.

The present invention aims to shorten a time required for a downshift and reduce a delay in response to an acceleration request in a coast stop vehicle which shifts down a transmission when the acceleration request is given from a driver.

According to an aspect of the present invention, a coast stop vehicle which performs a coast stop to stop an engine during travel of the vehicle, includes a transmission having a plurality of gear positions; a hydraulic pressure supplying unit which supplies a hydraulic pressure to the transmission while the engine is stopped; a coast stop start condition judging unit which judges whether or not a coast stop start condition holds; a coast stop control unit which stops the engine when the coast stop start condition is judged to hold by the coast stop start condition judging unit and starts the engine when receiving an acceleration request from a driver during the coast stop; a transmission control unit which causes a downshift of the transmission when receiving the acceleration request from the driver during the coast stop; and a hydraulic control unit which supplies the hydraulic pressure to an after-shift frictional engagement element which realizes a gear position after the downshift of the transmission during the coast stop.

According to another aspect of the present invention, a control method for a coast stop vehicle including an engine, a transmission having a plurality of gear positions and a hydraulic pressure supplying unit for supplying a hydraulic pressure to the transmission while the engine is stopped, the coast stop vehicle performing a coast stop for stopping the engine during travel of the vehicle, includes judging whether or not a coast stop start condition holds; stopping the engine when the coast stop start condition is judged to hold and starting the engine when an acceleration request is received from a driver during the coast stop; causing a downshift of the transmission when the acceleration request is received from the driver during the coast stop; and supplying the hydraulic pressure to an after-shift frictional engagement element which realizes a gear position after the downshift of the transmission during the coast stop.

Embodiments and advantages of this invention will be described in detail below with reference to the attached figures.

DESCRIPTION OF THE PREFERRED EMBODIMENT

In the following description, a "speed ratio" of a certain transmission mechanism is a value obtained by dividing an input rotation speed of this transmission mechanism by an output rotation speed thereof. Further, a "lowest speed ratio" is a maximum speed ratio of the transmission mechanism and a "highest speed ratio" is a minimum speed ratio thereof.

Figure 1:
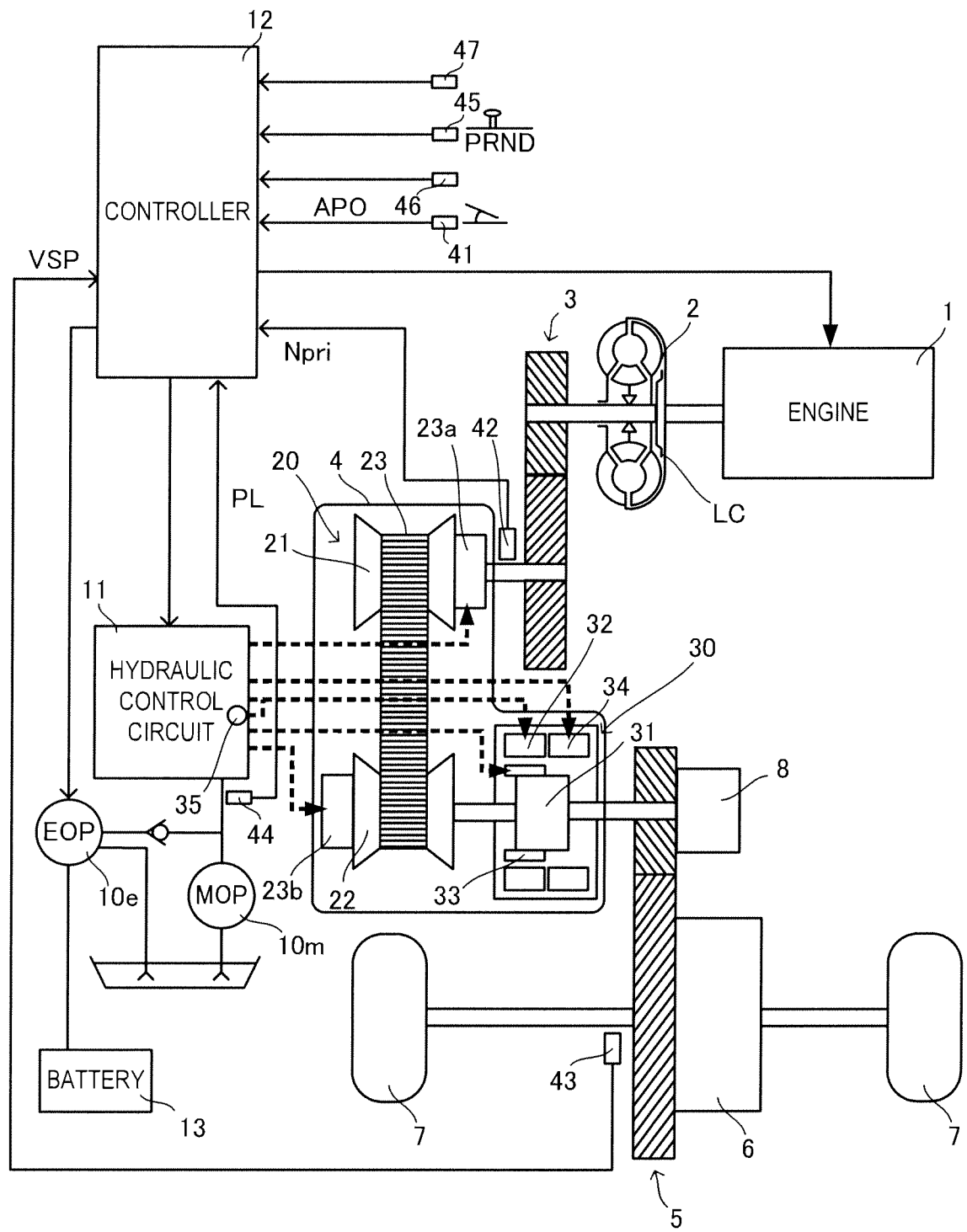
FIG. 1 is a schematic construction diagram of a coast stop vehicle according to an embodiment of the present invention.

FIG. 1 is a schematic construction diagram of a coast stop vehicle according to an embodiment of the present invention. This vehicle includes an engine 1 as a drive source, and output rotation of the engine 1 is transmitted to drive wheels 7 via a torque converter 2 with a lock-up clutch LC, a first gear train 3, a continuously variable transmission (hereinafter, merely referred to as a "transmission 4"), a second gear train 5 and a final reduction gear unit 6. The second gear train 5 includes a parking mechanism 8 for mechanically locking an output shaft of the transmission 4 in a parked state so as not to be able to rotate.

The transmission 4 is provided with a mechanical oil pump 10m to which the rotation of the engine 1 is input and which is driven by utilizing a part of power of the engine 1 and an electrical oil pump 10e which is driven upon receiving the supply of power from a battery 13. The electrical oil pump 10e is composed of an oil pump main body, and an electric motor and a motor driver for driving and rotating the oil pump main body and can control a driving load to a desired load or in multiple stages. Further, the transmission 4 includes a hydraulic control circuit 11 for adjusting a hydraulic pressure (hereinafter, referred to as a "line pressure PL") from the mechanical oil pump 10m or the electrical oil pump 10e and supplying the adjusted hydraulic pressure to the respective components of the transmission 4.

The lock-up clutch LC is engaged when a vehicle speed exceeds a lock-up start vehicle speed and released when the vehicle speed falls below a lock-up release vehicle speed. For example, the lock-up start vehicle speed is set at 6 km/h and the lock-up release vehicle speed is set at 12 km/h.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected to a front side (input shaft side) of the variator 20.

The variator 20 includes a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23a, 23b provided on the back surface of the movable conical plate for displacing the movable conical plate in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If hydraulic pressures supplied to the respective frictional engagement elements 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a gear ratio lower than in the first gear position if the high clutch 33 is engaged and the low brake 32 and the reverse brake 34 are released. Further, the sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

The respective frictional engagement elements are provided before or behind the variator 20 on the power transmission path, and any of them enables power transmission of the transmission 4 when being engaged while disabling power transmission of the transmission 4 when being released.

Further, an accumulator 35 is connected at an intermediate position of an oil path for supplying the hydraulic pressure to the low brake 32. The accumulator 35 delays the supply and discharge of the hydraulic pressure to and from the low brake 32, suppresses a sudden increase in the hydraulic pressure supplied to the low brake 32 by accumulating the hydraulic pressure at the time of selecting an N-D shift and prevents the occurrence of a shock due to sudden engagement of the low brake 32.

Figure 2:
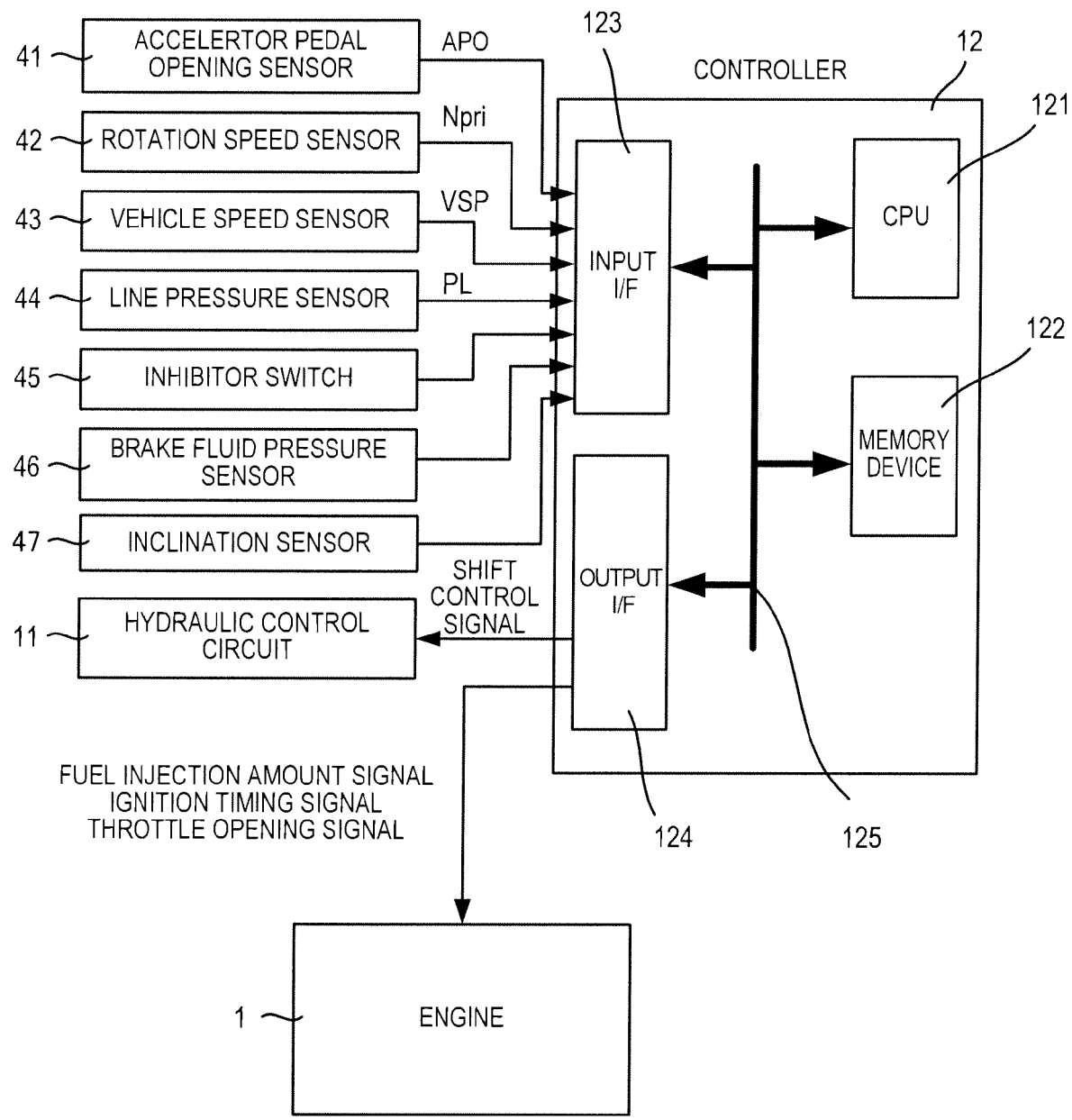
FIG. 2 is a diagram showing the internal configuration of a controller.

A controller 12 is a controller for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a vehicle speed VSP, an output signal of a line pressure sensor 44 for detecting the line pressure PL, an output signal of an inhibitor switch 45 for detecting the position of a select lever, an output signal of a brake fluid pressure sensor 46 for detecting a brake fluid pressure, an inclination sensor 47 for detecting the inclination of the vehicle body (≈road surface gradient), and like output signals.

A control program of the engine 1, a transmission control program of the transmission 4, and various maps/tables used in these programs are stored in the memory device 122. The CPU 121 reads the programs stored in the memory device 122 and implements them, performs various computations on various signals input via the input interface 123 to generate a fuel injection amount signal, an ignition timing signal, a throttle opening signal, a transmission control signal and a drive signal for the electrical oil pump 10e and outputs the generated signals to the engine 1, the hydraulic control circuit 11 and the motor driver of the electrical oil pump 10e via the output interface 124. Various values used in the computations by the CPU 121 and computation results are appropriately stored in the memory device 122.

The hydraulic control circuit 11 is composed of a plurality of flow paths and a plurality of hydraulic control valves. In accordance with the transmission control signal from the controller 12, the hydraulic control circuit 11 controls the plurality of hydraulic control valves to switch supply paths of the hydraulic pressures, prepares a necessary hydraulic pressure from a hydraulic pressure produced by the mechanical oil pump 10m or the electrical oil pump 10e, and supplies this to the respective components of the transmission 4. In this way, the speed ratio of the variator 20 and the gear position of the sub-transmission mechanism 30 are changed to shift the transmission 4.

Figure 3:
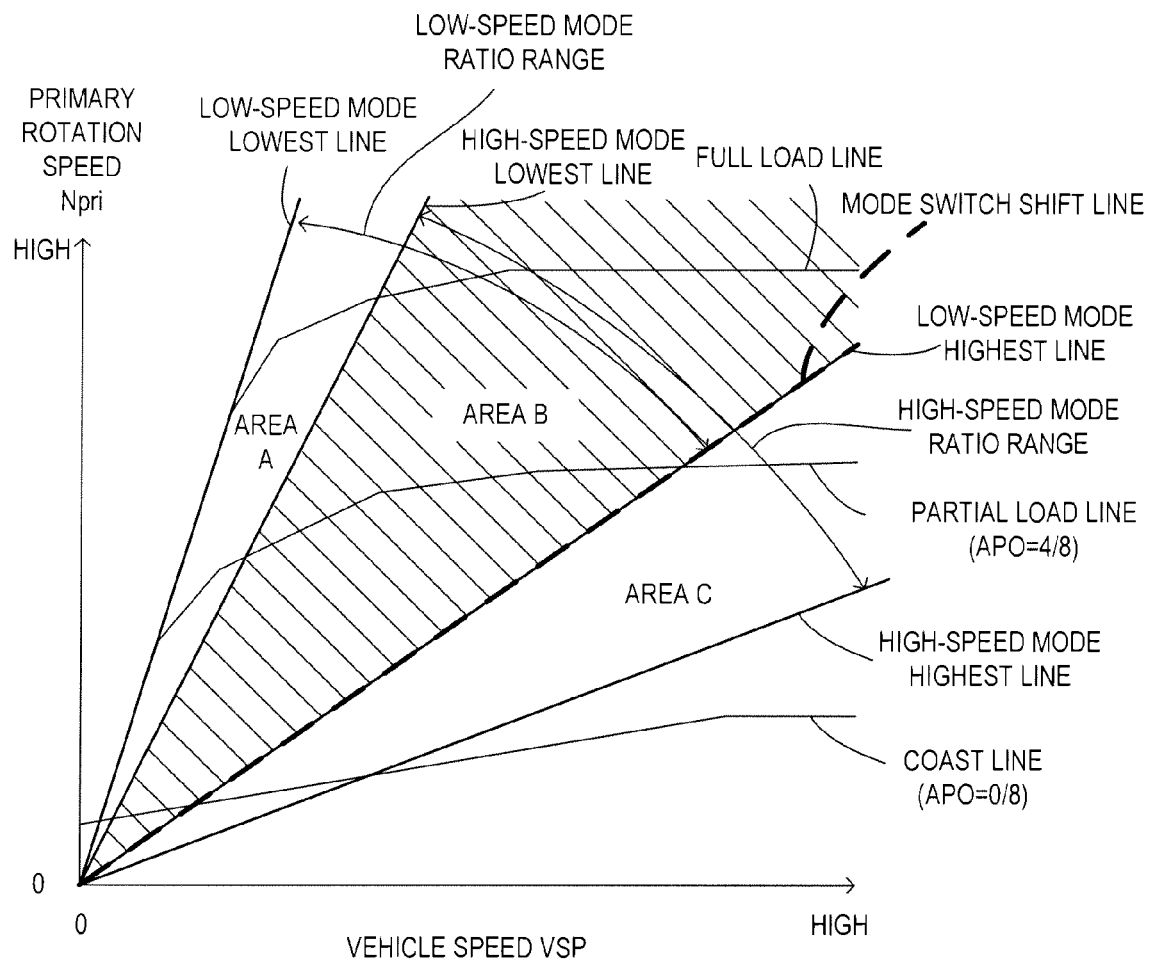
FIG. 3 is a graph showing an example of a shift map.

FIG. 3 shows an example of a shift map stored in the memory device 122. The controller 12 controls the variator 20 and the sub-transmission mechanism 30 according to a driving condition of the vehicle (in this embodiment, vehicle speed VSP, primary rotation speed Npri, accelerator pedal opening APO) based on this shift map.

In this shift map, an operating point of the transmission 4 is defined by the vehicle speed VSP and the primary rotation speed Npri. The inclination of a line connecting the operating point of the transmission 4 and a zero point at the lower left corner of the shift map corresponds to the speed ratio of the transmission 4 (overall speed ratio obtained by multiplying the speed ratio of the variator 20 by a speed ratio of the sub-transmission mechanism 30, hereinafter, referred to as a "through speed ratio"). In this shift map, a shift line is set for each accelerator pedal opening APO similar to a shift map of a conventional V-belt continuously variable transmission, and the transmission 4 is shifted in accordance with the shift line selected based on the accelerator pedal opening APO. Note that, for simplicity, only a whole load line (shift line when the accelerator pedal opening APO=8/8), a partial line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by setting the speed ratio of the variator 20 to the lowest speed ratio and a low-speed mode highest line obtained by setting the speed ratio of the variator 20 to the highest speed ratio. In this case, the operating point of the transmission 4 moves in areas A and B. On the other hand, when being in the high-speed mode, the transmission 4 can be shifted between a high-speed mode lowest line obtained by setting the speed ratio of the variator 20 to the lowest speed ratio and a high-speed mode highest line obtained by setting the speed ratio of the variator 20 to the highest speed ratio. In this case, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is lower than the speed ratio corresponding to the high-speed mode lowest line (high-speed mode lowest speed ratio). By this, a range of the through speed ratio of the transmission 4 that can be set in the low-speed mode ("low-speed mode ratio range" in FIG. 3) and a range of the through speed ratio of the transmission 4 that can be set in the high-speed mode ("high-speed mode ratio range" in FIG. 3) partly overlap, and the transmission 4 can be selectively set in either one of the low-speed mode and the high-speed mode if the operating point of the transmission 4 is in the area B defined between the high-speed mode lowest line and the low-speed mode highest line.

Further, on this shift map, a mode switch shift line at which the sub-transmission mechanism 30 is shifted is so set as to overlap the low-speed mode highest line. A through speed ratio corresponding to the mode switch shift line (hereinafter, referred to as a "mode switch speed ratio mRatio") is set at a value equal to the low-speed mode highest speed ratio. The mode switch shift line is set in this way because an input torque to the sub-transmission mechanism 30 decreases as the speed ratio of the variator 20 decreases and a shift shock when the sub-transmission mechanism 30 is shifted can be suppressed.

When the operating point of the transmission 4 crosses the mode switch shift line, i.e. an actual value of the through speed ratio (hereinafter, referred to as an "actual through speed ratio Ratio") changes over the mode switch speed ratio mRatio, the controller 12 performs a synchronization shift described below to switch between the high-speed mode and the low-speed mode.

In the synchronization shift, the controller 12 shifts the sub-transmission mechanism 30 and changes the speed ratio of the variator 20 in a direction opposite to a direction in which the speed ratio of the sub-transmission mechanism 30 changes. At this time, an inertial phase in which the speed ratio of the sub-transmission mechanism 30 actually changes and a period during which the speed ratio of the variator 20 changes are synchronized. The speed ratio of the variator 20 is changed in the direction opposite to the changing direction of the speed ratio of the sub-transmission mechanism 30 so that a change in input rotation caused by a difference in the actual through speed ratio Ratio does not give a sense of incongruity to a driver.

Specifically, when the actual through speed ratio Ratio of the transmission 4 changes over the mode switch speed ratio mRatio from the low side to the high side, the controller 12 changes the gear position of the sub-transmission mechanism 30 from the first gear position to the second gear position (1-2 shift, upshift) and changes the speed ratio of the variator 20 to the low side.

Conversely, when the actual through speed ratio Ratio of the transmission 4 changes over the mode switch speed ratio mRatio from the high side to the low side, the controller 12 changes the gear position of the sub-transmission mechanism 30 from the second gear position to the first gear position (2-1 shift, downshift) and changes the speed ratio of the variator 20 to the high side.

Such a downshift is performed when the vehicle decelerates in a state where the accelerator pedal opening APO is larger than a predetermined small opening (e.g. accelerator pedal opening APO=1/8) (state where an acceleration request is larger than a reference value). When the vehicle decelerates in the state where the accelerator pedal opening APO is smaller than the predetermined small opening (state where the acceleration request is smaller than the reference value) and the actual through speed ration Ratio of the transmission 4 changes over the mode switch speed ration mRatio from the high side to the low side, the sub-transmission mechanism 30 is not shifted down and the speed ratio of the variator 20 is changed to the low side with the gear position of the sub-transmission mechanism 30 kept in the second gear position. The sub-transmission mechanism 30 is shifted down after the vehicle stops to suppress a shift shock caused by an inertia change.

Further, the controller 12 performs a coast stop described below to improve fuel economy by suppressing the fuel consumption amount of the engine 1.

The coast stop is a technology for automatically stopping the engine 1 to suppress the fuel consumption amount while the vehicle is running in a low speed region (coast stop). This control is common to a fuel cut control executed when the accelerator is off in that fuel supply to the engine 1 is stopped, but differs therefrom in that the power transmission path between the engine 1 and the drive wheels 7 is cut off and the rotation of the engine 1 is completely stopped since the lock-up clutch LC is released (□ lock-up release vehicle speed≥coast stop permitting vehicle speed described later).

Upon executing the coast stop control, the controller 12 first judges conditions a1 to a4 listed below.
- a1: accelerator pedal is not depressed at all (accelerator pedal opening APO=0)
- a2: brake pedal is depressed (brake fluid pressure is a predetermined value or higher)
- a3: vehicle speed is the coast stop permitting vehicle speed (e.g. 9 km/h) or lower
- a4: lock-up clutch LC is released.

These conditions are, in other words, conditions to judge whether or not a driver has an intention to stop the vehicle.

The controller 12 judges that a coast stop start condition holds when all of these conditions a1 to a4 hold.

When judging that the coast stop start condition holds, the controller 12 stops the engine 1 and starts the drive of the electrical oil pump 10e.

As described above, the controller 12 does not shift the sub-transmission mechanism 30 when the vehicle decelerates in the state where the accelerator pedal opening APO is smaller than the predetermined small opening (state where the acceleration request is smaller than the reference value). Thus, during the coast stop, the gear position of the sub-transmission mechanism 30 is maintained in the second gear position that is a gear position at the time of starting the coast stop. When the vehicle stops, the controller 12 shifts down the sub-transmission mechanism 30 to ensure starting performance of the vehicle.

Further, the controller 12 determines whether or not the above conditions a1 to a4 respectively continue to hold and determines a select lever operation also during the coast stop. When even one of the above conditions a1 to a4 no longer holds, a driving range is shifted to D-range by a select lever operation or a manual mode is selected by the select lever and a downshift operation is performed, the controller 12 determines that a coast stop release condition holds and stops the coast stop, i.e. starts the engine 1 and stops the electrical oil pump 10e when the mechanical oil pump 10m comes to produce a sufficient hydraulic pressure.

Particularly, if the condition that no longer holds is a1, i.e. the accelerator pedal was depressed or the predetermined select lever operation was performed, there is an acceleration request from the driver. Thus, the controller 12 not only starts the engine 1, but also shifts down the sub-transmission mechanism 30 to increase drive power and ensure acceleration performance.

Further, to suppress the fuel consumption amount during a stop of the vehicle and improve fuel economy, the controller 12 performs an idle stop described below.

The idle stop is a technology for suppressing the fuel consumption amount by automatically stopping the engine 1 (idle stop) during a stop of the vehicle.

Upon performing the idle stop, the controller 12 determines conditions b1 to b8 listed below.

b1: vehicle is in a stopped state (VSP=0)
b2: brake pedal is depressed (brake switch 46=ON)
b3: accelerator pedal is not depressed at all (accelerator pedal opening APO=0)
b4: water temperature of the engine 1 is in a predetermined range Xe
b5: oil temperature of the transmission 4 is in a predetermined range Xt
b6: inclination of a vehicle body (≈road surface gradient) is a predetermined value or smaller
b7: rotation speed of the electrical oil pump 10e is a predetermined value or smaller (not excessively rotated)
b8: sub-transmission mechanism 30 is in the first gear position.

Then, the controller 12 deter mines that an idle stop start condition holds when all of these conditions a1 to a8 hold and permits the idle stop to automatically stop the engine 1.

A lower limit value of the predetermined range Xe of the water temperature of the engine 1 is set at a temperature at which warm-up of the engine 1 is judged to be already finished, and an upper limit value thereof is set at the lower limit of a high temperature region where after idle of the engine 1 is necessary.

During the idle stop, the electrical oil pump 10e is driven instead of the mechanical oil pump 10m and a hydraulic pressure produced by the electrical oil pump 10e is supplied to the frictional engagement elements of the transmission 4. Accordingly, the predetermined range Xt of the oil temperature of the transmission 4 is set to a temperature range where the electrical oil pump 10e can normally rotate in view of the viscosity of operating oil.

The controller 12 determines whether or not the above conditions b1 to b8 respectively continue to hold also during the idle stop, deter mines that an idle stop release condition holds when even one of these conditions no longer holds, and stops the idle stop, i.e. starts the engine 1 and stops the electrical oil pump 10e when the mechanical oil pump 10m comes to produce a sufficient hydraulic pressure.

Figure 4:
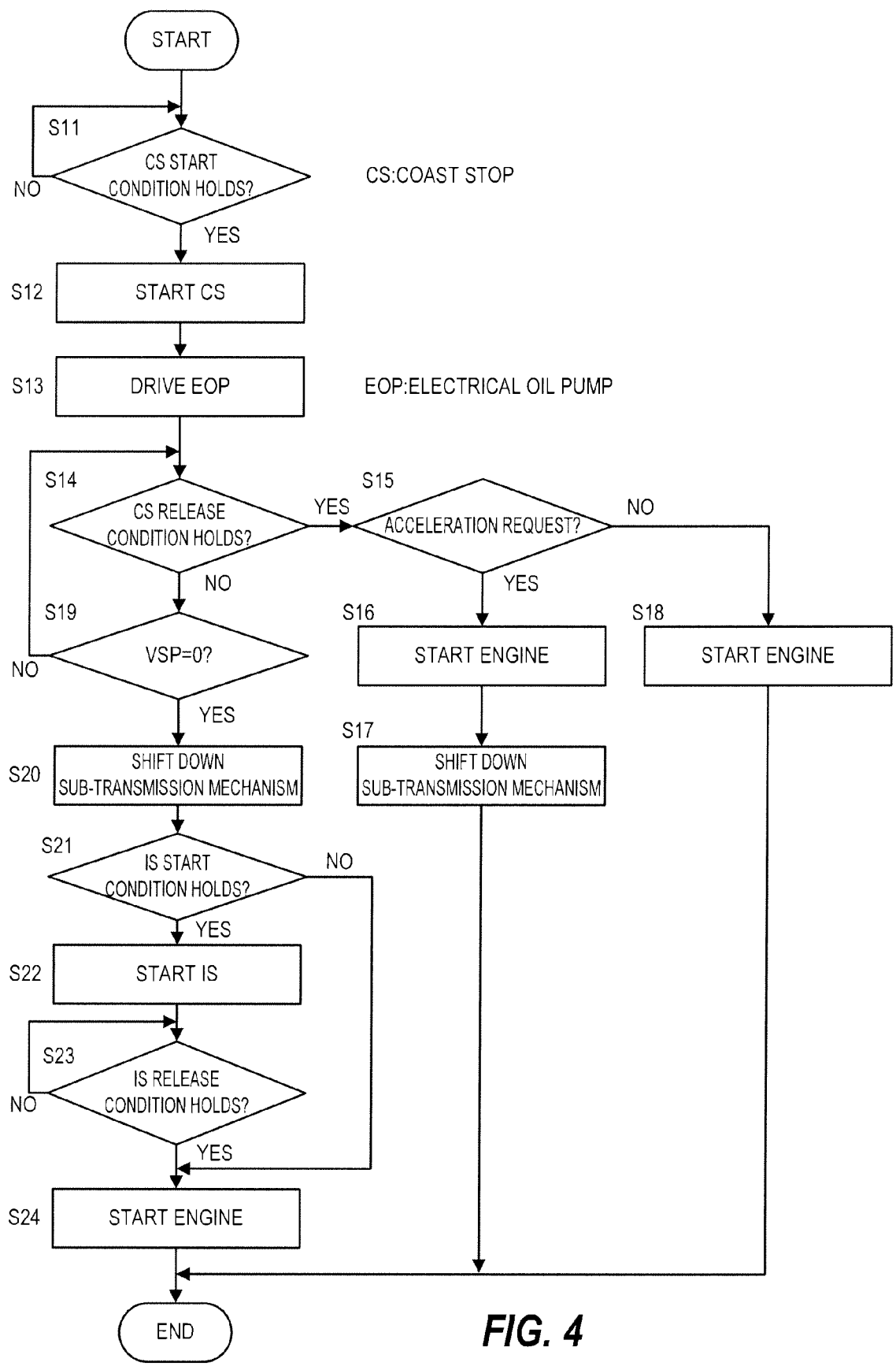
FIG. 4 is a flow chart showing contents of a control executed by the controller when the vehicle decelerates and stops.

When the vehicle decelerates and stops, the controller 12 successively performs the coast stop and the idle stop. FIG. 4 is a flow chart showing contents of a control executed by the controller 12 when the vehicle decelerates and stops. The contents of the control when the vehicle decelerates and stops are further described with reference to this flow chart.

First, in S11, the controller 12 judges whether or not the coast stop start condition holds. The coast stop start condition is judged to hold when all of the above conditions a1 to a4 hold. Judgment in S11 is repeated until the coast stop start condition is judged to hold and the process proceeds to S12 when it is judged to hold.

In S12, the controller 12 starts the coast stop. That is, the controller 12 stops fuel supply to the engine 1 to stop the engine 1. Since the lock-up release vehicle speed is faster than the coast stop permitting vehicle speed and the lock-up clutch LC is released before the start of the coast stop, the rotation speed of the engine 1 is reduced toward zero after fuel supply to the engine 1 is stopped. Accordingly, the rotation of the mechanical oil pump 10m is reduced and a discharge pressure approaches zero.

In S13, the controller 12 starts the drive of the electrical oil pump 10e. The hydraulic pressure produced by the electrical oil pump 10e is supplied to the frictional engagement element that realizes the gear position at the time of starting the coast stop, i.e. the high clutch 33 that realizes the second gear position to maintain the engagement of the high clutch 33. Simultaneously, the hydraulic pressure produced by the electrical oil pump 10e is also supplied to the low brake 32, which is the frictional engagement element that realizes a lower gear position than the one at the time of starting the coast stop, i.e. the first gear position, and the low brake 32 is controlled to a state immediately before engagement capacity is produced (state immediately before it becomes possible to transmit a torque).

Note that the processing in S13 (start of the drive of the electrical oil pump 10e) and that in S12 (start of the coast stop) are simultaneously or substantially simultaneously performed.

In S14, the controller 12 judges whether or not the coast stop release condition holds. The coast stop release condition is judged to hold when any one of the above conditions a1 to a4 no longer holds or when a predetermined select lever operation (switch operation from D-range to L-range, switch from D-range to the manual mode and a downshift operation) is performed. The process proceeds to S15 when the coast stop release condition holds while proceeding to S19 unless otherwise.

In S15, the controller 12 judges an acceleration request of the driver. The presence of the acceleration request is judged when the coast stop is released because the condition a1 no longer holds, i.e. the accelerator pedal was depressed or the predetermined select lever operation was performed. The absence of the acceleration request is judged when the coast stop is released for the other reason. The process proceeds to S16 when the presence of the acceleration request is judged while proceeding to S18 when the absence of the acceleration request is judged.

In S16, the controller 12 starts cranking and fuel injection of the engine 1 to start the engine 1. Only fuel injection is performed without performing cranking when an elapsed time from the stop of fuel injection to the engine 1 in S12 is short, the engine 1 is still rotating and the engine 1 can be started only by resuming fuel injection.

In S17, the controller 12 shifts down the sub-transmission mechanism 30. Since the hydraulic pressure is supplied beforehand to the low brake 32 that realizes the first gear position by the processing of S13 and the low brake 32 is controlled to the state to produce the engagement capacity (processing of S13), the sub-transmission mechanism 30 is promptly shifted down.

The processing of S18 is the same as that of S16. The controller 12 starts cranking and fuel injection of the engine 1 to start the engine 1.

On the other hand, in S19 reached when the coast stop release condition is judged not to hold, the controller 12 judges whether or not the vehicle speed VSP has become zero, i.e. the vehicle has stopped. The process proceeds to S20 when the vehicle speed VSP is zero, whereas a return is made to S14 to continue the coast stop when the vehicle speed VSP is not zero.

The processing of S20 is the same as that of S17. The controller 12 shifts down the sub-transmission mechanism 30.

In S21, the controller 12 judges whether or not the idle stop start condition holds. The idle stop start condition is judged to hold when all of the above conditions b1 to b8 hold. The process proceeds to S22 when the idle stop start condition is judged to hold while proceeding to S24 when it is judged not to hold.

In S22, the controller 12 starts the idle stop. Since the engine 1 is already stopped when the process proceeds to S22, the engine 1 is kept stopped in S22.

In S23, the controller 12 judges whether or not the idle stop release condition holds. The idle stop release condition is judged to hold when any one of the above conditions b1 to b8 no longer holds. The process remains in S23 until the idle stop release condition holds while proceeding to S24 when it holds.

In S24, the controller 12 starts cranking and fuel injection of the engine 1 to start the engine 1.

In this way, the coast stop and the idle stop are successively performed (S12, S22) when the vehicle decelerates and stops. If an acceleration request is received during the coast stop, the engine 1 is started and the sub-transmission mechanism 30 is shifted down (S14 to S17).

Next, functions and effects achieved by executing the above control are described.

Figure 5:
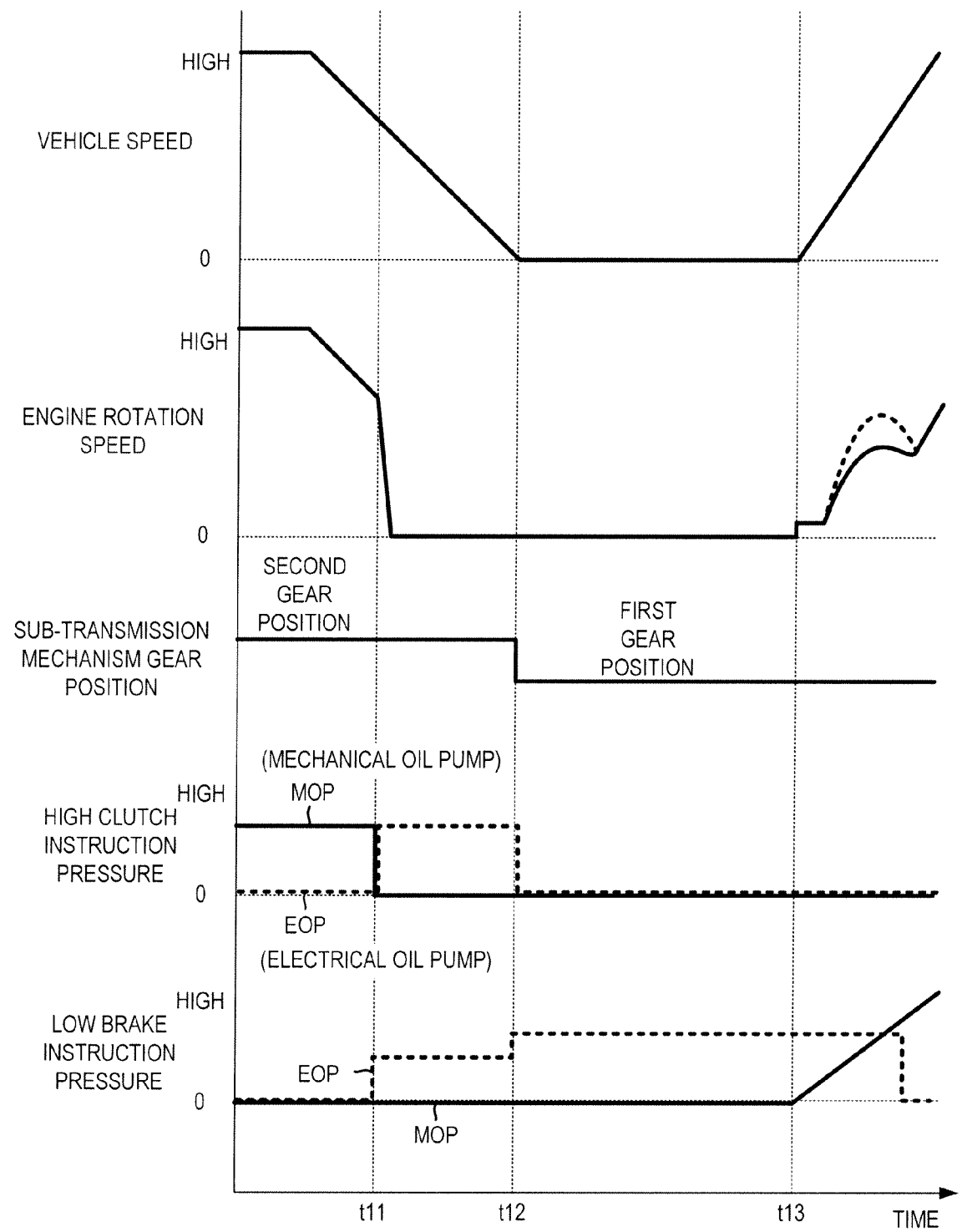
FIG. 5 is a flow chart showing contents of a coast stop release control executed by the controller.

FIG. 5 shows a state when the vehicle decelerates and stops and, then, starts after a while.

At time t11, the coast stop start condition holds and the engine 1 is stopped. In this way, the drive of the mechanical oil pump 10m is stopped to zero its discharge pressure and, instead of this, the drive of the electrical oil pump 10e is started.

The hydraulic pressure produced by the electrical oil pump 10e is supplied to the high clutch 33, whereby the high clutch 33 is kept in the engaged state and the gear position is maintained in the second gear position. Simultaneously, the hydraulic pressure produced by the electrical oil pump 10e is also supplied to the low brake 32 and the low brake 32 is controlled to the state immediately before the engagement capacity is produced (state immediately before it becomes possible to transmit a torque).

When the vehicle completely stops at time t12, a transition is made from the coast stop to the idle stop and the gear position of the sub-transmission mechanism 30 is changed from the second gear position to the first gear position. Since the hydraulic pressure is supplied to the low brake 32 beforehand, the sub-transmission mechanism 30 is promptly shifted down.

When the accelerator pedal is depressed at time t13, the engine 1 is started and the vehicle accelerates. When the discharge pressure of the mechanical oil pump 10m increases, the drive of the electrical oil pump 10e is stopped.

Since the low brake 32 is engaged, the rev-up of the engine 1 is suppressed and a sense of incongruity given to the driver can be reduced. That is, when the engine 1 revs up, the rotation speed of the engine 1 then temporarily falls (engine rotation speed shown by broken line in FIG. 5). Since the rotation speed of the engine 1 falls despite an increase in the vehicle speed VSP, a sense of incongruity is given to the driver. However, such a sense of incongruity is reduced by suppressing the rev-up of the engine 1.

Figure 6:
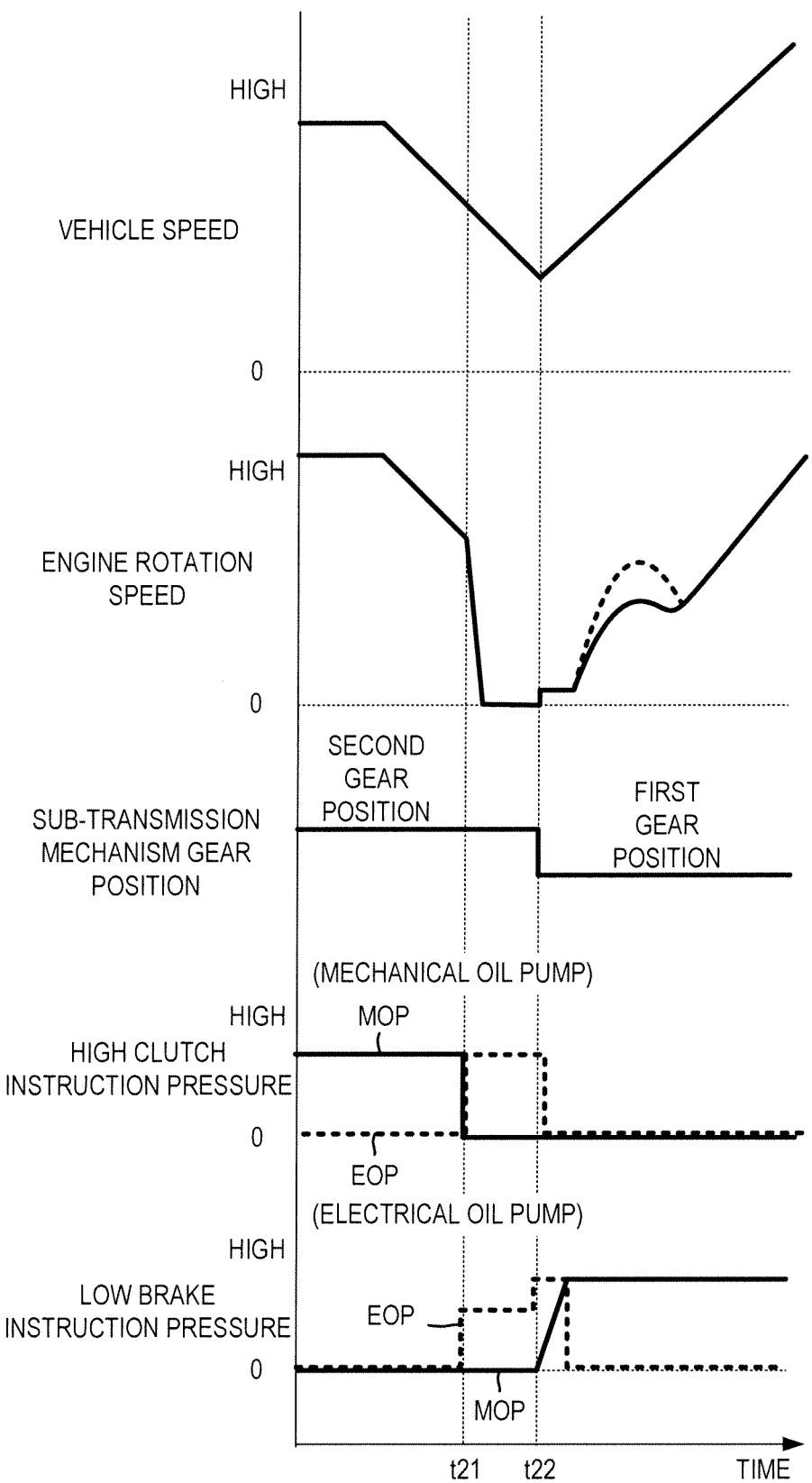
FIG. 6 is a flow chart showing contents of an oil pump switch control executed by the controller.

FIG. 6 shows a state when the vehicle re-accelerates immediately after the vehicle decelerates and the engine 1 is stopped by the coast stop control.

At time t21, the coast stop condition holds and the engine 1 is stopped. In this way, the drive of the mechanical oil pump 10m is stopped, the discharge pressure thereof becomes zero and the drive of the electrical oil pump 10e is started instead of this.

The hydraulic pressure produced by the electrical oil pump 10e is supplied to the high clutch 33, the high clutch 33 is kept in the engaged state and the gear position is maintained in the second gear position. Simultaneously, the hydraulic pressure produced by the electrical oil pump 10e is also supplied to the low brake 32 and the low brake 32 is controlled to the state immediately before the engagement capacity is produced (state immediately before it becomes possible to transmit a torque).

At time t22, the accelerator pedal is depressed before the vehicle stops, i.e. the vehicle speed VSP becomes zero. When the accelerator pedal is depressed, the engine 1 is started and the sub-transmission mechanism 30 is shifted down.

Since the hydraulic pressure is supplied to the low brake 32 beforehand, it is possible to obtain good acceleration performance by promptly shifting down the sub-transmission mechanism 30 and increasing drive power even if the accelerator pedal is depressed immediately after the engine 1 stops in this way. Since the hydraulic pressure supplied to the low brake 32 is the hydraulic pressure immediately before the low brake 32 produces the engagement capacity, a time required for a downshift is shortened to a minimum level. Further, since the rev-up of the engine 1 (engine rotation speed shown by broken line in FIG. 6) is suppressed, a sense of incongruity given to the driver can be reduced (as in the example of FIG. 5).

Since the supply of the hydraulic pressure to the high clutch 33 is continued during the coast stop, a time required until drive power required by the driver is obtained is shortened even if no downshift is performed at the time of releasing the coast stop.

Particularly, since the high clutch 33 is kept in the engaged state during the coast stop in this embodiment, drive power is generated without delay when no downshift is performed. Further, since the gear position at the time of starting the coast stop is maintained, a shift shock can also be suppressed.

Further, since the supply of the hydraulic pressure to the low brake 32 is started simultaneously with (or substantially simultaneously with) the start of the coast stop in this embodiment, the sub-transmission mechanism 30 can be promptly shifted down even if the accelerator pedal is depressed before the rotation speed of the engine 1 becomes zero. In this case, if the rotation speed of the engine 1 is sufficient, the engine 1 can be started only by resuming fuel injection to the engine 1.

As described above, according to the above control, good acceleration performance can be realized by promptly shifting down the sub-transmission mechanism 30 and promptly generating drive power required by the driver when the sub-transmission mechanism 30 is shifted down in response to an acceleration request during the coast stop.

Note that, in this embodiment, the frictional engagement element needed to be engaged to realize the gear position after the downshift is only the low brake 32. It goes without saying that, in the case of a transmission mechanism including a plurality of such frictional engagement elements, a hydraulic pressure needs to be supplied to all of these frictional engagement elements beforehand during the coast stop.

Although the embodiment of the present invention has been described above, the above embodiment is merely one application example of the present invention and not of the nature to limit the technical scope of the present invention to the specific construction of the above embodiment. Various changes can be made without departing from the gist of the present invention.

For example, although the supply of the hydraulic pressure to the low brake 32 is started simultaneously with the start of the coast stop in the above embodiment, the supply of the hydraulic pressure to the low brake 32 may be started at an earlier timing before the start of the coast stop. For example, the supply of the hydraulic pressure to the low brake 32 is started when the vehicle speed is reduced to a vehicle speed (e.g. 12 km/h) higher than the coast stop permitting vehicle speed (9 km/h).

Since the engine 1 is still operating and the hydraulic pressure produced by the mechanical oil pump 10m can be supplied to the low brake 32 before the start of the coast stop, a load of the electrical oil pump 10e necessary to control the low brake 32 to the state immediately before the engagement capacity is produced is reduced and the electrical oil pump 10e can be made smaller.

Note that even when the supply of the hydraulic pressure to the low brake 32 is started before the start of the coast stop, the supply of the hydraulic pressure to the low brake 32 is started after the lock-up clutch LC is released. For example, if the supply of the hydraulic pressure to the low brake 32 is started based on the vehicle speed as a condition, the vehicle speed at which the supply of the hydraulic pressure to the low brake 32 is started is set at the lock-up release vehicle speed or lower (12 km/h or lower in this embodiment).

This can alleviate a shock since the lock-up clutch LC is released even if the low brake 32 produces the engagement capacity in response to pulsation of the discharge pressure of the mechanical oil pump 10m and the sub-transmission mechanism 30 is temporarily interlocked while the engine 1 is rotating.

Note that the vehicle speed at which the supply of the hydraulic pressure to the low brake 32 is started is preferably matched with the lock-up release vehicle speed when the lock-up release vehicle speed and the coast stop permitting vehicle speed are close as in this embodiment. This setting can prevent the hydraulic pressure from being supplied to the low brake 32 before the lock-up release and simplify the control.

In this embodiment, the sub-transmission mechanism 30 is not shifted down when the vehicle decelerates in the state where the accelerator pedal opening is smaller than the predetermined small opening (state where the acceleration request is smaller than the reference value) and the sub-transmission mechanism 30 is shifted down when the accelerator pedal opening is larger than the predetermined small opening (state where the acceleration request is larger than the reference value) and the vehicle speed is reduced to a downshift vehicle speed determined by the mode switch shift line. The supply of the hydraulic pressure to the low brake 32 may be started when the vehicle speed is reduced to the downshift vehicle speed or when the vehicle speed is reduced to a vehicle speed which is the sum of the downshift vehicle speed and a margin a, i.e. before the vehicle speed is reduced to the downshift vehicle speed.

In this way, the hydraulic pressure can be supplied to the low brake 32 beforehand in the entire vehicle speed region where the sub-transmission mechanism 30 needs to be shifted down to obtain good acceleration performance, and drive power required by the driver can be realized by promptly shifting down the sub-transmission mechanism 30 in the case of receiving an acceleration request.

Conversely, the supply of the hydraulic pressure to the low brake 32 may be started after the start of the coast stop. According to this construction, even if the low brake 32 produces the engagement capacity in response to pulsation of the discharge pressure of the mechanical oil pump 10m and the sub-transmission mechanism 30 is interlocked, a shock caused by the interlock can be alleviated since the engine 1 is stopped.

Further, if the supply of the hydraulic pressure to the low brake 32 is started before the rotation speed of the engine 1 becomes zero, the engine 1 can be started by cranking and the sub-transmission mechanism 30 can be shifted down when the rotation speed of the engine 1 is equal to or lower than a rotation speed at which cranking is possible even if the accelerator pedal is depressed before the rotation speed of the engine 1 becomes zero.

Furthermore, during the coast stop, the pressure supplied to the high clutch 33 may be set at the hydraulic pressure immediately before the engagement capacity is produced and the low brake 32 may be in the engaged state. That is, the sub-transmission mechanism 30 is shifted down beforehand.

According to this construction, a time required for shifting down the sub-transmission mechanism 30 in response to an acceleration request becomes zero, thereby being able to eliminate a delay in generating drive power. Note that the high clutch 33 needs to be engaged again when no downshift is performed and the vehicle travels with the gear position at the time of starting the coast stop (second gear position) kept unchanged. However, since the high clutch 33 is in the state immediately before being engaged, a time required for the engagement is very short. Further, since there is no acceleration request, a little sense of incongruity is given to the driver even if drive power is generated with delay.

During the coast stop, the both hydraulic pressures supplied to the high clutch 33 and the low brake 32 may be the hydraulic pressure immediately before the engagement capacity is produced.

According to this construction, drive power required by the driver can be realized within a very short period of time both in the case where a downshift is performed in response to an acceleration request and in the case where no downshift is performed and the vehicle travels with the gear position at the time of starting the coast stop (second gear position) kept unchanged. As compared to the above embodiment in which the high clutch 33 is maintained in the engaged state, there is a slight delay in generating the drive power when the vehicle travels with the gear position at the time of starting the coast stop (second gear position) kept unchanged. However, since generation of the drive power is delayed in the absence of the acceleration request, a little sense of incongruity is given to the driver.

The sub-transmission mechanism 30 may have three or more gear positions. In this case, the frictional engagement element to which the hydraulic pressure immediately before the engagement capacity is produced is supplied may be successively switched to the one that realizes a lower gear position according to the vehicle speed as the vehicle speed decreases during a coast stop. That is, it is designed to supply the hydraulic pressure to the frictional engagement element that realizes the gear position used in the case of an acceleration request, whereby good acceleration performance can be realized by a downshift to an optimal gear position at the time of acceleration.

The above coast stop control is applicable not only to the continuously variable transmission 4 including the sub-transmission mechanism 30 as in this embodiment, but also to a transmission including only a stepped transmission mechanism.

Further, the gear position realized by the frictional engagement element to which the hydraulic pressure is supplied beforehand during the coast stop is not limited to the gear position used in a normal shift and, if an intermediate gear position between certain two gear positions can be realized, may be such an inter mediate gear position. In this case, acceleration is performed using this intermediate gear position at the time of an acceleration request.

Although a means for supplying the hydraulic pressures to the low brake 32 and the high clutch 33 while the engine 1 is stopped is the electrical oil pump 10e in this embodiment, it may be an accumulator which stores the hydraulic pressure produced by the mechanical oil pump 10m during the operation of the engine 1.

This application claims priority based on Japanese Patent Application No. 2010-262435, filed with the Japan Patent Office on Nov. 25, 2010, the entire content of which is incorporated into this specification by reference.

What is claimed is:

1. A coast stop vehicle configured to perform a coast stop to stop an engine during travel of the vehicle, comprising:
   a transmission having a plurality of gear positions;
   a hydraulic pressure supplying unit configured to supply a hydraulic pressure to the transmission while the engine is stopped;
   a coast stop start condition judging unit configured to judge whether or not a coast stop start condition holds;
   a coast stop control unit configured to stop the engine when the coast stop start condition is judged to hold by the coast stop start condition judging unit and configured to start the engine when receiving an acceleration request from a driver during the coast stop;
   a transmission control unit configured to cause a downshift of the transmission when receiving the acceleration request from the driver during the coast stop; and
   a hydraulic control unit configured to supply a hydraulic pressure to an after-shift frictional engagement element which realizes a gear position after the downshift of the transmission during the coast stop.

2. The coast stop vehicle according to claim 1, wherein a hydraulic pressure is also configured to be supplied to an initial frictional engagement element which realizes the gear position at a time of starting the coast stop during the coast stop.

3. The coast stop vehicle according to claim 2, wherein the initial frictional engagement element is configured to be set in an engaged state and the hydraulic pressure supplied to the after-shift frictional engagement element is configured to be set at the hydraulic pressure immediately before engagement capacity is produced during the coast stop.

4. The coast stop vehicle according to claim 1, wherein the hydraulic control unit is configured to start the supply of the hydraulic pressure to the after-shift frictional engagement element simultaneously with start of the coast stop.

5. The coast stop vehicle according to claim 1, wherein the hydraulic control unit is configured to start supplying the hydraulic pressure to the after-shift frictional engagement element before start of the coast stop.

6. The coast stop vehicle according to claim 5, wherein the transmission includes a torque converter with a lock-up clutch; and
   wherein the hydraulic control unit is configured to start supplying the hydraulic pressure to the after-shift frictional engagement element after the lock-up clutch is released and before the coast stop is started.

7. The coast stop vehicle according to claim 3, wherein the transmission control unit is configured to maintain the gear position at the time of starting the coast stop if the acceleration request from the driver is smaller than a reference value and is configured to shift down the transmission when a vehicle speed reaches a downshift vehicle speed if the acceleration request is larger than the reference value during the coast stop; and
   wherein the hydraulic control unit is configured to start supplying the hydraulic pressure to the after-shift frictional engagement element before the vehicle speed is reduced to the downshift vehicle speed.

8. The coast stop vehicle according to claim 1, wherein the hydraulic control unit is configured to start supplying the hydraulic pressure to the after-shift frictional engagement element after the coast stop is started and before a rotation speed of the engine becomes zero.

9. The coast stop vehicle according to claim 1, wherein the hydraulic control unit is configured to set a hydraulic pressure supplied to an initial frictional engagement element which realizes the gear position at a time of starting the coast stop at the hydraulic pressure immediately before engagement capacity is produced and is configured to set the after-shift frictional engagement element in an engaged state during the coast stop.

10. The coast stop vehicle according to claim 1, wherein the hydraulic control unit is configured to also supply a hydraulic pressure to an initial frictional engagement element which realizes the gear position at a time of starting the coast stop and is configured to set the hydraulic pressures supplied to the initial frictional engagement element and the after-shift frictional engagement element at the respective hydraulic pressures immediately before engagement capacity is produced during the coast stop.

11. The coast stop vehicle according to claim 1, wherein the transmission has three or more gear positions; and
    wherein the hydraulic control unit is configured to set a frictional engagement element which realizes a lower gear position as a vehicle speed decreases as the after-shift frictional engagement element and is configured to supply the hydraulic pressure to the after-shift frictional engagement element.

12. A control method for a coast stop vehicle including an engine, a transmission having a plurality of gear positions and a hydraulic pressure supplying unit which supplies a hydraulic pressure to the transmission while the engine is stopped, the coast stop vehicle performing a coast stop for stopping the engine during travel of the vehicle, comprising:
    judging whether or not a coast stop start condition holds;
    stopping the engine when the coast stop start condition is judged to hold and starting the engine when an acceleration request is received from a driver during the coast stop;
    causing a downshift of the transmission when the acceleration request is received from the driver during the coast stop; and
    supplying a hydraulic pressure to an after-shift frictional engagement element which realizes a gear position after the downshift of the transmission during the coast stop.

13. A coast stop vehicle which performs a coast stop to stop an engine during travel of the vehicle, comprising:
    a transmission having a plurality of gear positions;
    hydraulic pressure supplying means for supplying a hydraulic pressure to the transmission while the engine is stopped;
    coast stop start condition judging means for judging whether or not a coast stop start condition holds;
    coast stop control means for stopping the engine when the coast stop start condition is judged to hold by the coast stop start condition judging means and starting the engine when receiving an acceleration request from a driver during the coast stop;

transmission control means for causing a downshift of the transmission when receiving the acceleration request from the driver during the coast stop; and hydraulic control means for supplying a hydraulic pressure to an after-shift frictional engagement element which realizes a gear position after the downshift of the transmission during the coast stop.

* * * * *